(12) United States Patent
Akahoshi

(10) Patent No.: US 7,182,926 B2
(45) Date of Patent: Feb. 27, 2007

(54) PROCESS FOR SEPARATING AND RECOVERING VALUABLE METALS

(75) Inventor: Toshiaki Akahoshi, Ibaraki (JP)

(73) Assignee: Y. K. YSK Technosystem, Ibaraki (JP)

( * ) Notice: Subject to any disclaimer, the term of this patent is extended or adjusted under 35 U.S.C. 154(b) by 315 days.

(21) Appl. No.: 10/829,264

(22) Filed: Apr. 22, 2004

(65) Prior Publication Data

US 2004/0213717 A1 Oct. 28, 2004

(30) Foreign Application Priority Data

Apr. 25, 2003 (JP) ............................ P2003-121903

(51) Int. Cl.
- *C01G 37/00* (2006.01)
- *C01G 31/00* (2006.01)
- *C22B 34/20* (2006.01)
- *B01J 20/34* (2006.01)

(52) U.S. Cl. ............................ 423/67; 423/56; 502/24; 502/26

(58) Field of Classification Search ................... 423/67, 423/56; 502/24, 26
See application file for complete search history.

(56) References Cited

U.S. PATENT DOCUMENTS

| | | | |
|---|---|---|---|
| 4,500,495 A | * | 2/1985 | Hubred et al. ................. 423/53 |
| 4,584,184 A | * | 4/1986 | Nalewajek et al. ............ 423/15 |
| 4,587,109 A | * | 5/1986 | Lyaudet et al. ................ 423/15 |
| 6,180,072 B1 | * | 1/2001 | Veal et al. ..................... 423/54 |

* cited by examiner

*Primary Examiner*—Steven Bos
*Assistant Examiner*—James Fiorito
(74) *Attorney, Agent, or Firm*—Armstrong, Kratz, Quintos, Hanson & Brooks, LLP

(57) ABSTRACT

A process for economically separating and recovering valuable metal components, with few kinds of chemicals being used, with no waste water that causes environmental pollution being discharged, and also perfectly no by-products being formed by means of simple steps. The process includes a step of leaching a raw material containing at least vanadium oxides and molybdenum oxides with ammonia-containing leaching water to obtain a leached solution containing a vanadium compound and a molybdenum compound, a step of adding ammonium orthomolybdate to the leached solution to separate and recover the deposited ammonium metavanadate from a first solution for separation, a step of adding a water-soluble alcohol to the separated solution to separate and recover the deposited ammonium orthomolybdate from a second solution for separation, a step of distilling the second solution for separation to separate and recover the water-soluble alcohol and a residue solution, a step of adding at least a portion of the residue solution to the ammonia-containing leaching water as the portion thereof, and a step of returning a portion of the recovered ammonium orthomolybdate and a total of a recovered, water-soluble alcohol to the system for reusing.

8 Claims, 1 Drawing Sheet

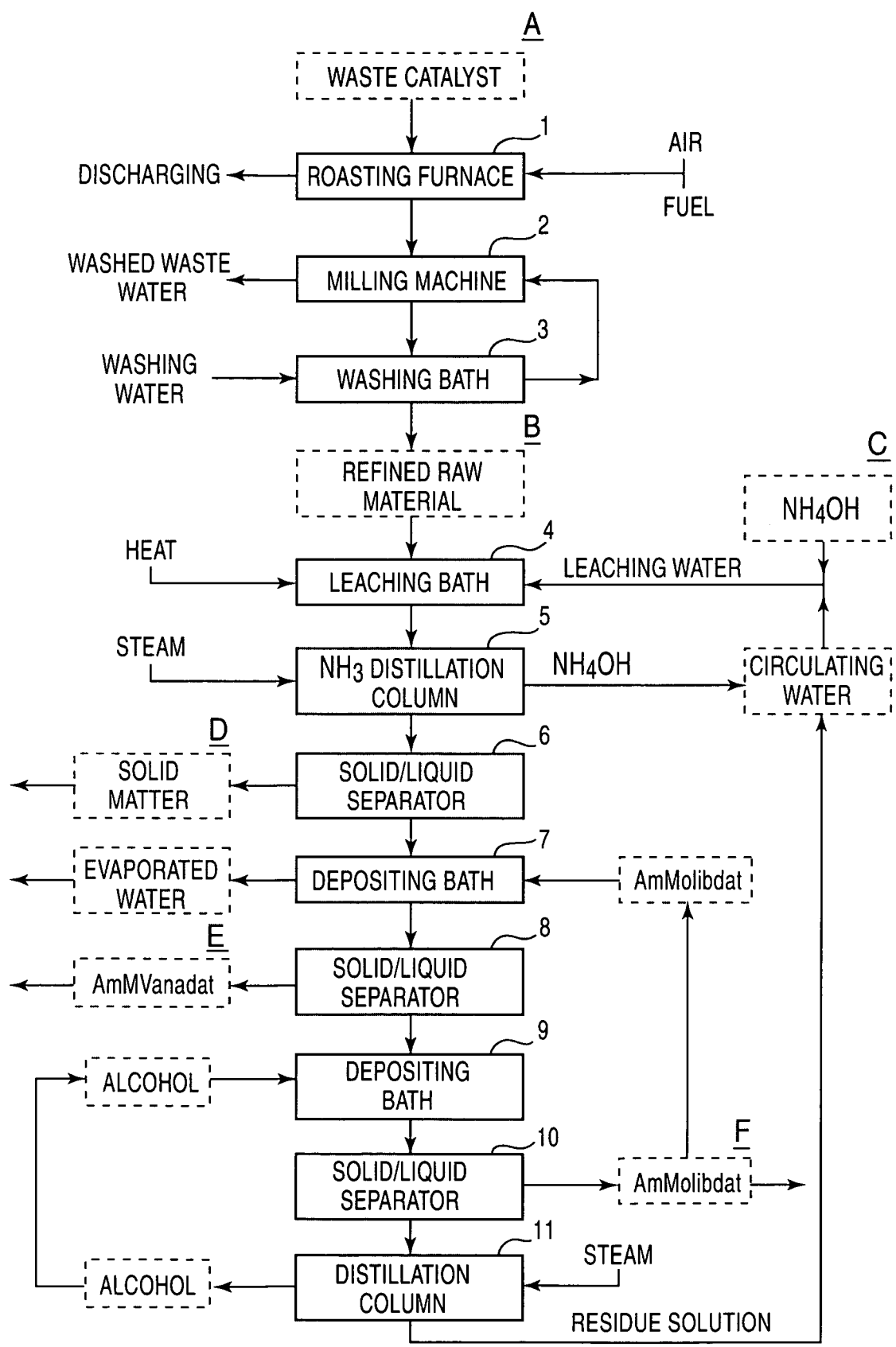

PROCESS FOR SEPARATING AND RECOVERING VALUABLE METALS

BACKGROUND OF THE INVENTION

1. Field of the Invention

The present invention relates to a process for separating and recovering valuable metals, and, more particularly, to a process for separating and recovering valuable metals contained in waste catalysts used in hydrodesulfurization of petroleum products, etc. With the subject process, few kinds of chemicals are used, waste water that causes environmental pollution is minimally discharged, and also no by-products are formed by means of simple steps.

2. Description of the Related Art

Materials produced by having molybdenum/cobalt-based catalyst metals supported on alumina-based carriers are normally used as desulfurization catalysts for petroleum products. In use of this catalyst, for example, for the desulfurization of heavy oil heavy metals such as vanadium, nickel and the like, contained in the heavy oil, are caused to adhere to the catalyst, as well as the activity of the catalyst being gradually lowered on account of iron, sulfur, phosphorous, etc. adhering to the catalyst. Thus, these effects require discharging the contaminated catalyst as a waste catalyst and replacing it with a new catalyst to carry out desulfurization. Direct dumping of such a waste catalyst, not only causes environmental pollution, but also is associated with the waste of valuable metals. Thus, petroleum refining companies contract with disposal dealers to deal with waste catalysts. The disposal dealers recover valuable metals such as vanadium, molybdenum and the like from the waste catalysts received.

Several methods have thus far been tried to separate and recover valuable metals contained in the waste catalyst. One of them is a method that includes separating and recovering valuable metals through the use of caustic soda. This process involves removing oil matter, sulfur, phosphorus, etc. that adhere to the waste catalyst by roasting the waste catalyst in advance, and subsequently leaching the resultant material with an aqueous caustic soda solution to separate and recover valuable metals. However, the use of sulfuric acid for neutralizing the caustic soda solution results in the generation of a large amount of Grauber salt (sodium sulfate) as a by-product and also results in leaving the sodium salt to the final stage.

In addition, the aluminum component of the waste catalyst is leached as sodium aluminate from a carrier for the catalyst material such as alumina or silica/alumina. As a result, the aluminum needs to be separated as aluminum hydroxide. Furthermore, this method also poses problems in that all of the steps are complicated. For example, the steps regarding a variety of treating chemicals such as caustic soda, sulfuric acid for neutralization, ammonium sulfate for salting out, and the like, as well as those additional steps as necessary for separation of the extracting chemicals added in excess, refinement of the resulting extracted solution containing valuable metals, and so forth.

As another method, the soda roasting method exists which involves roasting a mixture of waste catalyst and soda ash (sodium carbonate) to change the metals into soda salts, and then separating the metals as an aqueous solution of valuable metal components by leaching the soda salts with water. However, this method causes problems as well in that all of the steps are complicated requiring various chemicals including soda ash, ammonium chloride for salting out, hydrochloric acid for neutralization, and the like, thus leading to the formation of a large amount of various kinds of by-products. Therefore, a method is desired that does not require the use of different kinds of chemicals, has simple steps, and is also capable of reducing the amounts of by-products.

SUMMARY OF THE INVENTION

The present invention is directed to an economical process for separating and recovering valuable metals that does not need various kinds of chemicals, restricts the generation of waste water which could result in environmental pollution, and also forms no by-products by means of simple steps when recovering valuable metals from waste catalysts, or the like. The present invention is in contrast to the conventional technique for separating and recovering valuable metal components such as vanadium, molybdenum, nickel and the like from petroleum refining catalyst wastes, as discussed above, which makes use of a variety of and large amounts of chemicals to generate large amounts of by-products as well as discharges most process water as waste water.

Features of a process for separating and recovering valuable metals that is capable of attaining the object of the present invention include a step of leaching a raw material containing at least vanadium oxides and molybdenum oxides with ammonia-containing leaching water to obtain a leached solution containing a vanadium compound and a molybdenum compound, a step of adding ammonium orthomolybdate to the leached solution to separate and recover the deposited ammonium metavanadate from a first solution for separation, a step of adding a water-soluble alcohol to the separated solution to separate and recover the deposited ammonium orthomolybdate from a second solution for separation, a step of distilling the second solution for separation to separate and recover the water-soluble alcohol and a residue solution, in which at least a portion of the aforementioned residue solution is added to the aforementioned ammonia-containing leaching water as a portion thereof, and in which a portion of the recovered ammonium orthomolybdate and a total of a recovered, water-soluble alcohol are returned to the system for reuse.

The aforementioned raw material used in the present invention contains at least vanadium oxides and molybdenum oxides. The use of a waste catalyst for petroleum desulfurization containing vanadium and molybdenum as a raw material involves roasting the raw material under an oxidizing atmosphere to incineration to remove the adhering oil, sulfur, phosphorus and the like coming from the petroleum, and further to convert metal components such as vanadium, molybdenum and the like into oxides thereof. As a result, the resultant material can suitably be used as a raw material suitable for a process of the present invention for separating and recovering valuable metal components.

In the present invention, a depositing agent for depositing the ammonium salts of vanadium from a leached solution utilizes ammonium orthomolybdate; a water-soluble alcohol used for depositing and recovering the ammonium orthomolybdate remaining in the solution is not particularly limited, but is preferably ethanol.

In this way, when ammonium orthomolybdate is employed in order to recover ammonium compounds of vanadium and ammonium compounds of molybdenum, the process includes a first step of leaching a raw material containing at least vanadium oxides and molybdenum oxides with ammonia-containing leaching water to obtain a leached slurry containing ammonium metavanadate and ammonium orthomolybdate; a second step of distilling the leached slurry to recover the aqueous ammonia and then remove the residue, thereby obtaining a leached solution; a third step of adding ammonium orthomolybdate to the leached solution to separate and recover the deposited ammonium metavanadate, thereby obtaining the first solution for separation; a fourth step of adding ethanol to the first solution for separation to separate and recover the deposited ammonium orthomolybdate to thereby obtain a second solution for separation; and a fifth step of distilling the second solution for separation to separate and recover the ethanol and a residue solution. The process preferably circulates aqueous ammonia recovered in the second step and a residue solution recovered in the fifth step to the first step as at least a portion of ammonia-containing leaching water, a portion of ammonium orthomolybdate recovered in the fourth step to the third step, and ethanol recovered in the fifth step to the forth step, for reuse.

According to this process, the process has the advantages of preventing the possibility of environmental pollution and of being economical due to the fact that harmful waste water or the like is not generated except that extracted residues of valuable metals are discharged into the outside of the system. This is due to the fact that by-products are not formed at all on account of sub-materials being used are all circulated to the steps of the system for reuse, when ammonium salts of vanadium and molybdenum are produced from a raw material containing at least vanadium oxides and molybdenum oxides through the use of water and ammonia as sub-raw materials.

In addition, for separating and recovering valuable metals, the ammonia concentration of leaching water used in the above-described first step may be 0.1% by weight or more, whereas the amount of use of ammonia is desirably an amount sufficient enough to convert valuable metals contained in a waste catalyst into ammonium salts, and is particularly preferably from about 2 to about 5% by weight.

Furthermore, in the above-described first step using the ammonia-containing leaching water, it is economical to carry out leaching under an atmosphere in the presence of oxygen, particularly in the presence of an oxygen-containing gas, preferably by blowing air or the like into the leaching device. Additionally, the leaching temperature is 50° C. or higher. Preferably, the temperature is from 70 to 100° C. to further increase the leaching speed, which allows the reaction to efficiently proceed.

In the process for separating and recovering valuable metals described above, the concentration of ammonium orthomolybdate for the purpose of salting out the ammonium metavanadate in the above-described leached solution in the third step may, be 10% by weight or more based on the solution. In addition, the pH of the solution may be maintained to be 7 or more. Moreover, cooling the temperature of the solution to 50° C. or less increases the deposit degree of the ammonium metavanadate, enabling the increase in the recovery factor of the ammonium metavanadate.

BRIEF DESCRIPTION OF THE DRAWING

The FIGURE shows a step flow chart describing a process for separating and recovering valuable metals of the present invention.

DETAILED DESCRIPTION OF THE PREFERRED EMBODIMENTS

Raw materials to which a process for separating and recovering valuable metals of the present invention can be applied include materials containing vanadium oxides and molybdenum oxides. Also, a waste catalyst and the like, used until now in desulfurization treatment of petroleum can, be used as a raw material suited for separating and recovering valuable metals by means of a method of the present invention. However, a catalyst for petroleum desulfurization comprises a material supporting molybdenum, cobalt, or the like on a carrier such as, for example, silica/alumina or the like, and a waste catalyst used in petroleum desulfurization has impurities such as oil matter, sulfur, phosphorus, etc. as well as metal components such as vanadium, nickel, etc. are stuck onto the material. Thus a suitable pretreatment needs to be conducted in order to increase treatment efficiency.

As pretreatment for such a waste catalyst, the catalyst is oxidation roasted in advance using a rotary kiln, etc. to burn and remove oil matter, sulfur, phoshorus, etc. and the catalyst metal components such as vanadium, molybdenum, etc. are converted into the form of oxides. A roasting condition thereof is desirably concluded at a temperature of the divanadium pentaoxide melting point (690° C.) or less. After the roasting, the catalyst material is subjected to milling by a milling machine such as a ball mill and further to water-soluble component is removed by sufficiently water washing. Then the resultant material may be used as a raw material for a method for separating and recovering valuable metals according to the present invention.

A method for separating and recovering valuable metals of the present invention is preferably carried out in accordance with, for example, the procedure indicated in FIG. 1. Now, as an example in which valuable metals are separated and recovered from the waste catalyst used in the above-described petroleum refinement, each apparatus and operation of each step, including the pretreatment step of the waste catalyst, in the present invention, will be set forth according to the FIGURE.

According to the FIGURE, A is a waste catalyst from which valuable metals are separated and recovered. The pretreatment step thereof includes supplying the waste catalyst A to a roasting furnace 1 such as, for example, a rotary kiln and the like, and then oxidation roasting the waste catalyst in a temperature range of 400 to 600° C. to burn and remove oil matter attached, etc., as well as to convert contained metal components into the form of oxides. If the roasting temperature is below 400° C., the burning and removal of the attached oil matter, sulfur, phosphorus, etc. and the oxidation of the metal components probably will be insufficient, and so care should be exercised. The waste catalyst obtained in this manner after oxidation roasting is ground with a milling machine 2 such as, for example, a wet ball mill or the like, so that the particle diameter is 0.5 mm or less, and the particles are transferred into a washing bath 3 along with washing water for water washing, and then the particles are dehydrated to thereby obtain refined raw material B.

The first step of a method for separating and recovering valuable metals of the present invention involves incorporating the aforementioned refined raw material B into a pressure resistance type leaching bath 4 fitted with an agitating device, and subsequently making the refined raw material into a slurry by use of ammonia-containing leaching water prepared by adding aqueous ammonia C. The ammonia concentration needs to be 0.1% by weight or more, but in order to effectively convert valuable metals to ammonium salts, the ammonia concentration is preferably 0.5% by weight or higher, particularly preferably from about 2 to about 5% by weight. In this connection, it is to be noted that the residue water to be recovered in the final step of a process for separating and recovering valuable metals of the present invention can be used as the water for adjusting the ammonia concentration in the leaching water used here.

This raw material slurry is heated to 50° C. or more, preferably to 70 to 100° C., by means of, for example, external heating or the like, while agitating the slurry in the leaching bath 4. Also, the reaction atmosphere is kept acidic during the interval that the leaching reaction proceeds by blowing air or oxygen into the leaching bath 4, or introducing an oxidant such as hydrogen peroxide or the like. Because the ammonia in the solution is consumed as the metal oxides are converted to ammonium salts, ammonia may, as appropriate, be added in the form of aqueous ammonia or the like.

In this case, the pH of the slurry is 7.0 or higher in order to efficiently allow the leaching reaction to progress. In particular, a pH of 10 to 12 causes the vanadium in the slurry to be converted into ammonium metavanadate and the molybdenum in the slurry to be converted into ammonium orthomolybdate as well as causing portions of nickel and cobalt to be converted into ammonia complexes, or the like, thereby being leached. However, if the pH of the slurry is less than 7.0, no leaching can be attained, the vanadium is changed into a yellow compound, and a portion of the molybdenum is changed into hexaammonium heptamolybdate. As a result, the subsequent slurry treatment is probably unstable.

The second step includes transferring the aforementioned leached slurry into an ammonia distillation column, for example, equipped with a vapor heating re-boiler or the like, and distilling extra ammonia in the leached slurry to separate and recover the ammonia as aqueous ammonia. The aqueous ammonia recovered in this way is first stored, and then is combined with the residue solution recovered in the final step, all being circulated and used as ammonia-containing leaching water used in the first step. After surplus ammonia is recovered, the leached slurry having a pH range of 7 to 9 contains insoluble hydroxides of nickel and cobalt that were formerly solved as ammonia complexes and the like. The hydroxides are separated together with leached residues, etc. as solid matter D by means of a solid/liquid separator 6 such as, for example, a vertical type centrifugal filter, a vacuum filter, or the like to thereby obtain a leached solution containing primarily ammonium metavanadate and ammonium orthomolybdate.

The next or third step involves transferring the aforementioned leached solution into a depositing bath equipped with, for example, a gas/liquid contact type cooling tower and a agitating device; circulating the leached solution to the gas/liquid contact type cooling tower or the like to make the leached solution temperature to 50° C. or less, preferably to cool the solution to 30° C. or less; and subsequently adding ammonium orthomolybdate thereto to efficiently deposit the ammonium metavanadate due to the salting-out effect of ammonium orthomolybdate. If the leached solution temperature is 50° C. or less, the ammonium metavanadate deposits without problems, and if the solution temperature is further lowered to 30° C. or less, the degree of deposition of the ammonium metavanadate is increased partly because the water evaporates to reduce the amount of solution and also the amount of an alcohol used for recovering the ammonium orthomolybdate in the fourth step can be reduced.

In addition, after ammonium orthomolybdate is added, if the concentration of the ammonium orthomolybdate is less than 5% by weight, the deposition of the ammonium metavanadate in the solution becomes insufficient, which does not sufficiently lower the vanadium concentration in the solution and which poses a problem of affecting the purity of the ammonium orthomolybdate recovered in a later step. Also, even though the concentration of the ammonium orthomolybdate is from 5% by weight inclusive to below about 10% by weight, the concentration of the salts in the solution after recovery of the ammonium orthomolybdate in the fourth step later is decreased, and so too much alcohol needs to be used thereby leading to a probable decrease in economy. On the other hand, even if the concentration of the ammonium orthomolybdate exceeds 40% by weight, no particular advantage is obtained, and therefore the concentration of the ammonium orthomolybdate is preferably from 10 to 40% by weight.

Separation and recovery of the ammonium metavanadate deposited by a solid/liquid separator such as, for example, a vertical type centrifugal filter, a vacuum filter or the like, provides a wet cake E of the ammonium metavanadate and the first solution for separation primarily containing ammonium orthomolybdate. The wet cake of the ammonium metavanadate thus recovered, which includes a mother liquor containing ammonium orthomolybdate, can be easily increased in purity if the mother liquor is removed by water washing. The washing water in this case may utilize fresh supplementary feed, or the residue solution recovered in the final step may beused as the washing water, and this washing liquid can also be reused as a portion of the above-described leaching water.

The fourth step involves transferring the first solution for separation obtained in the above-described third step to a depositing bath 9 fitted with a agitating device, and at the same time adding a water-soluble alcohol, preferably ethanol, in an amount from 2 to 10 times the first solution for separation in a volume ratio, preferably from 2 to 5 times, as a depositing agent for ammonium orthomolybdate so as to deposit the ammonium orthomolybdate. When the volume of ethanol is 2 times or less than that of the first solution for separation, the deposition of the ammonium orthomolybdate is insufficient. As a result, a portion of the ammonium orthomolybdate moves into the residue solution recovered in the final step, which in turn increases the concentration of the ammonium orthomolybdate in the leaching water of the first step, having a disadvantage of decreasing the solubility of ammonium metavanadate on account of salting-out effect of ammonium orthomolybdate during leaching in the first step. On the other hand, even if the volume of ethanol exceeds 5 times that of the first solution for separation, the deposition degree of the ammonium orthomolybdate remains almost the same and the amount of vapor for distilling the added ethanol increases, which are both undesirable.

Separation and recovery of the ammonium orthomolybdate deposited here by a solid/liquid separator such as, for example, a vertical type centrifugal filter, a vacuum filter or the like, provides a wet cake F of the ammonium orthomolybdate and the second solution for separation primarily containing water and alcohol. Although the wet cake of the ammonium orthomolybdate thus obtained includes mother liquor mainly containing water and alcohol, this mother liquor rarely contains salts except ammonium orthomolybdate. Therefore, just by drying the mother liquor, a high purity ammonium orthomolybdate product is obtained. The ammonium orthomolybdate product also offers an advantage of being capable of being directly reused in the form of a wet cake as a salting-out agent for ammonium metavanadate in the above-described third step since the slight alcohol remaining causes no interference.

Furthermore, the fifth step includes supplying the aforementioned second solution for separation to an intermediate stage of an alcohol distilling column equipped with, for example, a re-boiler by vapor heating, recovering ethanol with a concentration of 96% from the top of the column, and using a method for, for example, recovering a residue solution from the bottom portion capable of being separated into alcohol and a residue solution. The water-containing ethanol thus recovered is circulated and used as a salting-out agent for ammonium orthomolybdate in the above-described fourth step. In addition, the residue solution recovered here can be circulated and used in combination with the aqueous ammonia recovered in the above-described second step as water for adjusting the ammonia concentration, which becomes a portion of leaching water used in the above-described first step. Therefore, a surplus residue solution is not generated under normal operating conditions.

The process for separating and recovering valuable metals of the present invention includes efficiently leaching vanadium and molybdenum contained in a raw material as ammonium salts with ammonia, water, air, ammonium orthomolybdate, and a water-soluble alcohol, and discharging the other useless components as leached residues, with minimization of discharged waste water, and also perfectly no formation of by-products by means of simple steps. Also essentially, the process is economical because no materials need to be supplemented other than ammonia, which reacts with the vanadium and the molybdenum in a raw material to produce ammonium metavanadate and ammonium orthomolybdate that are taken out of the system.

EXAMPLE

Hereafter, a process for separating and recovering valuable metals of the present invention will be set forth in detail with reference to an Example. In addition, the present invention is by no means limited due to this Example, and can be carried out, as appropriate, with modifications within the spirit of the present invention.

A waste catalyst used in desulfurization treatment of petroleum was spread on a heat resistant wire gauze and was heated with a gas burner to remove by burning oil matter and sulfur adhering to the waste catalyst. Then, the resultant catalyst was transferred into a rotary tube electric furnace having a diameter of 10 cm and a length of 90 cm and was oxidation roasted at 600° C. for three hours while ventilating. Further, the resulting material was subjected to grinding with a dry DESINTA type grinder followed by water washing. The pretreated waste catalyst thus prepared had a metal component content of 7.2% vanadium, 4.9% molybdenum, 2.9% nickel, and 0.8% cobalt in the dry state.

(First Step)

Into a vessel of 20 L capacity, to which is attached a stainless steel stirrer, 10 kg of water, blown air with a flow rate of 2 L/min, and 1.5 kg of aforementioned pretreated waste catalyst were introduced to yield a slurry. Subsequently, the vessel was heated on the bottom, and 1.6 kg of 25% aqueous ammonia was added. When the solution temperature reached 80° C., then leaching was continued for two hours. The air discharged from the vessel was cooled with a heat exchanger. Although the system was structured such that ammonia-containing condensed water formed was returned to the vessel itself, the escape of the ammonia could not be avoided completely, and so 25% aqueous ammonia was, as required, supplemented to keep the ammonia concentration in the slurry to some extent. As a result, the total amount of supplemental ammonia was about 0.35 kg.

(Second Step)

After the completion of leaching, ammonia was removed for 90 minutes by increasing the flow rate of air blown in to 10 L/min while keeping the solution temperature at 95° C. in order to remove surplus ammonia. After removal of ammonia, was a hot leached slurry sent to a vacuum filter to conduct solid and liquid separation, thereby obtaining about 2.2 kg of wet solid matter containing catalyst residues and about 10.9 kg of purplish red bleached solution having a pH of 9.1 at 30° C.

The concentrations of vanadium and molybdenum contained in the aforementioned leached solution were determined to be vanadium of 8.4 gV/kg and molybdenum of 5.9 gMo/kg. Calculation from these results gave leached ratios of 95% vanadium and 98% molybdenum. Additionally, although the aforementioned wet solid matter contained about 50% water, the vanadium and the molybdenum adhering to the wet solid matter can readily be recovered by water washing, and therefore environmental pollution can be prevented and simultaneously the washing water can be utilized as a portion of the above-mentioned leaching water.

(Third Step)

10.0 Kilograms of the aforementioned leached solution was taken out and transferred into a depositing bath, and into the depositing bath was gradually added 2.0 kg of a crystal of ammonium orthomolybdate prepared in advance. As a result, a crystal of ammonium metavanadate was precipitated due to the salting-out effect of ammonium orthomolybdate. The slurry which was allowed to stand for one hour and which reached 27° C. was solid/liquid separated by vacuum filtration to recover 270 g of a wet ammonium metavanadate crystal containing about 29% mother liquor and about 11.7 kg of a first solution for separation containing primarily ammonium orthomolybdate.

Moreover, the mother liquor adhering to the aforementioned wet ammonium metavanadate crystal could easily be removed by simple washing processing.

In addition, analysis of the aforementioned first solution for separation provided a vanadium concentration of 36 mgV/kg and a molybdenum concentration of 88.5 gMo/kg, with a concentration in terms of ammonium orthomolybdate of about 18.1% being confirmed. The calculation from this result gave a deposition ratio of ammonium metavanadate of 99.5%.

(Fourth Step)

5.0 Kilograms of the first solution for separation obtained in the above-described third step was taken out and put into a depositing bath having a capacity of 45 L and to the depositing bath was gradually added 15 L (11.92 kg) of reagent grade ethanol with stirring so as to deposit a crystal of ammonium orthomolybdate. In one hour, this slurry was vacuum filtered to recover 1.04 kg of a wet ammonium orthomolybdate crystal containing about 15% mother liquor and about 15.5 kg of the second solution for separation. This second solution for separation comprised water-containing ethanol comprising about 25.6% water and about 74.4% ethanol in weight ratio. From the analytical result of this solution, the molybdenum concentration was 1.2 gMo/kg, and this solution was found to contain a little more than 0.24% ammonium orthomolybdate. Calculation from this result gave a total deposition ratio of deposited ammonium orthomolybdate and ammonium orthomolybdate added as the salting-out agent of 97.7%.

300 Grams of the aforementioned second solution for separation was placed into a fractionating device equipped with a packed column and ethanol was fractionally distilled to yield 231 g of 96% by weight ethanol and about 67 g of a residue solution. This residue solution contained about 1.1% ammonium orthomolybdate, which did not cause any problem when the residue solution was used as leaching water in the first step.

According to a process for separating and recovering valuable metals of the present invention, there can efficiently be produced, and separated and recovered, ammonium compounds of valuable metals with a simple, compact apparatus by a leaching operation which uses only ammonia from a raw material containing valuable metals such as vanadium, molybdenum, etc. Other chemicals need to be supplemented to the system exclusive of ammonia which reacts with valuable metals and which is taken out of the system. Furthermore, no by-products are generated, and so no facilities for treating by-products are required and therefore, no operating costs thereof are necessary. Thus a process for separating and recovering valuable metals of the present invention has the effect of extensive improvement in economy as compared with the conventional methods for recovering valuable metals.

What is claimed is:

1. A process for separating and recovering valuable metals, comprising the steps of:
    (a) leaching a raw material containing at least vanadium oxides and molybdenum oxides with ammonia-containing leaching water to obtain a leached solution containing a vanadium compound and a molybdenum compound,
    (b) adding ammonium orthomolybdate to the leached solution to deposit and recover ammonium metavanadate, while allowing a first residue solution to remain,
    (c) adding a water-soluble alcohol to said first residue solution to deposit and recover ammonium orthomolybdate, while allowing a second residue solution to remain, and
    (d) distilling said second residue solution to recover the water-soluble alcohol, while allowing a third residue solution to remain to function as ammonia-containing leaching water, wherein
    at least a portion of said third residue solution is returned into said step (a) to be added to the ammonia-containing leaching water as a portion thereof, and wherein
    a portion of the recovered ammonium orthomolybdate is returned to said step (b) and a total of said recovered, water-soluble alcohol are returned to said step (c).

2. The process for separating and recovering valuable metals according to claim 1, wherein
    the raw material is obtained by roasting a waste catalyst for petroleum desulfurization containing vanadium and molybdenum under an oxidizing atmosphere.

3. The process for separating and recovering valuable metals according to claim 1 or 2, wherein
    the water-soluble alcohol is ethanol.

4. The process for separating and recovering valuable metals according to claim 3, comprising:
    a first step of leaching a raw material containing at least vanadium oxides and molybdenum oxides with ammonia-containing leaching water to obtain a leached slurry containing ammonium metavanadate and ammonium orthomolybdate;
    a second step of distilling the leached slurry to recover the aqueous ammonia and then remove the residue, thereby obtaining a leached solution;
    a third step of adding ammonium orthomolybdate to the leached solution to deposit and recover the deposited ammonium metavanadate, thereby obtaining a first residue solution;
    a fourth step of adding ethanol to the first residue solution to separate and recover the deposited ammonium orthomolybdate to thereby obtain a second residue solution; and
    a fifth step of distilling the second residue solution to separate and recover the ethanol and a third residue solution; wherein
    aqueous ammonia recovered in the second step and said third residue solution recovered in the fifth step are circulated to the first step as at least a portion of ammonia-containing leaching water; wherein
    a portion of ammonium orthomolybdate recovered in the fourth step is circulated to the third step; and wherein
    ethanol recovered in the fifth step is circulated to the fourth step; for reusing.

5. The process for separating and recovering valuable metals according to claim 4, wherein
    the ammonia concentration of ammonia-containing leaching water in the first step is 0.1% by weight or more.

6. The process for separating and recovering valuable metals according to claim 4, wherein
    leaching in the first step is carried out in an atmosphere of the presence of oxygen at 50° C. or higher.

7. The process for separating and recovering valuable metals according to claim 4, wherein
    the leaching of ammonium metavanadate in the third step is conducted under conditions of the ammonium orthomolybdate concentration being 10% by weight or more based on the weight of the leached solution.

8. The process for separating and recovering valuable metals according to claim 4, wherein
    the leaching of ammonium metavanadate in the third step is carried out, with the pH being 7 or more and the temperature being cooled to 50° C. or less in the leached solution.

* * * * *